United States Patent
Waldburger

(10) Patent No.: US 11,968,954 B2
(45) Date of Patent: *Apr. 30, 2024

(54) PRESS COVER

(71) Applicant: Kalt Maschinenbau AG, Lütisburg (CH)

(72) Inventor: Peter Waldburger, Niederbüren (CH)

(73) Assignee: Kalt Maschinenbau AG, Lütisburg (CH)

( * ) Notice: Subject to any disclaimer, the term of this patent is extended or adjusted under 35 U.S.C. 154(b) by 998 days.

This patent is subject to a terminal disclaimer.

(21) Appl. No.: 16/224,856

(22) Filed: Dec. 19, 2018

(65) Prior Publication Data

US 2019/0191659 A1    Jun. 27, 2019

(30) Foreign Application Priority Data

Dec. 21, 2017   (CH) ..................................... 01585/17

(51) Int. Cl.
*A01J 25/15*   (2006.01)
*A01J 25/13*   (2006.01)

(52) U.S. Cl.
CPC .............. *A01J 25/15* (2013.01); *A01J 25/13* (2013.01)

(58) Field of Classification Search
CPC ................................. A01J 25/15; A01J 25/13
See application file for complete search history.

(56) References Cited

U.S. PATENT DOCUMENTS

| | | | |
|---|---|---|---|
| 913,889 A | 3/1909 | Hershiser |
| 2,815,708 A | 12/1957 | Pauly |
| 2,846,767 A | 8/1958 | Hensgen |
| 2,917,827 A | 12/1959 | Landford |
| 2,942,983 A | 6/1960 | Sadler |
| 3,098,297 A | 7/1963 | Boer |
| 3,192,626 A | 7/1965 | Boeuf |
| 3,353,269 A | 11/1967 | Lambert |
| 3,514,857 A | 6/1970 | Rossen |
| 3,541,687 A | 11/1970 | Peters |
| 3,615,587 A | 10/1971 | Koopmans |
| 3,650,030 A | 3/1972 | Delamere |

(Continued)

FOREIGN PATENT DOCUMENTS

| | | |
|---|---|---|
| AU | 2005239793 B2 | 2/2008 |
| BR | 9300409 A | 9/1993 |

(Continued)

OTHER PUBLICATIONS

Derwent abstract for SU876084, published Oct. 1981, 2 pages.

(Continued)

*Primary Examiner* — Seyed Masoud Malekzadeh

(74) *Attorney, Agent, or Firm* — Fleit Intellectual Property Law; Paul D. Bianco; Stephen Bongini

(57) ABSTRACT

A press cover corresponds to a cheese mould, in particular a cheese mould that is arranged in a cassette press or the like. The press cover has a simple construction, to withstand pressure and to meet high hygienic standards. The press cover is of one piece and comprises a single-walled perforated plate, and a ribbed structure integrally formed on the side of the perforated plate remote from the cheese mould. The ribbed structure comprises longitudinal ribs in the form of webs and annular cross ribs arranged crossing the latter.

16 Claims, 2 Drawing Sheets

(56) References Cited

U.S. PATENT DOCUMENTS

| | | | |
|---|---|---|---|
| 3,733,804 A | 5/1973 | Diersbock | |
| 3,748,072 A * | 7/1973 | Whelan | B30B 9/28 |
| | | | 99/452 |
| 3,783,166 A | 1/1974 | Peters | |
| 3,797,980 A * | 3/1974 | Budahn | A01J 25/13 |
| | | | 425/84 |
| 3,802,332 A | 4/1974 | Fassbender et al. | |
| 3,836,688 A | 9/1974 | Fischer | |
| 3,838,955 A * | 10/1974 | Dubbeld | A01J 25/13 |
| | | | D7/672 |
| 3,841,210 A | 10/1974 | Brog | |
| 3,973,042 A | 8/1976 | Kosikowski et al. | |
| 4,049,838 A | 9/1977 | Krueger et al. | |
| 4,068,014 A | 1/1978 | Heimbruch | |
| 4,268,528 A | 5/1981 | Montigny | |
| 4,318,684 A | 3/1982 | Boucher | |
| 4,418,616 A | 12/1983 | Streeter et al. | |
| 4,440,073 A | 4/1984 | Quilliou | |
| 4,472,339 A * | 9/1984 | van der Ploeg | A01J 25/13 |
| | | | 425/84 |
| 4,509,413 A | 4/1985 | Granberg et al. | |
| 4,515,815 A | 5/1985 | Kosikowski | |
| 4,750,415 A | 6/1988 | Ostemar | |
| 4,817,515 A | 4/1989 | Bjerre et al. | |
| 5,052,290 A | 10/1991 | Nielsen | |
| 5,065,671 A * | 11/1991 | Tameris | A01J 25/13 |
| | | | 220/675 |
| 5,082,681 A | 1/1992 | Barlow et al. | |
| 5,206,496 A | 4/1993 | Clement et al. | |
| 5,227,079 A * | 7/1993 | Tameris | A01J 25/13 |
| | | | 425/84 |
| 5,411,182 A * | 5/1995 | Marte | B65D 83/0044 |
| | | | 222/386 |
| 5,752,434 A * | 5/1998 | Kuan | A23C 20/025 |
| | | | 99/496 |
| 5,794,779 A * | 8/1998 | Weinheimer | B65D 81/22 |
| | | | 206/443 |
| 5,974,779 A | 11/1999 | Orscheln et al. | |
| 6,026,737 A | 2/2000 | D'Alterio et al. | |
| 6,310,333 B2 * | 10/2001 | Shibata | B29C 45/2738 |
| | | | 219/676 |
| 6,465,033 B2 | 10/2002 | Menninga et al. | |
| 6,701,997 B2 * | 3/2004 | Gellert | C23C 26/00 |
| | | | 164/95 |
| 6,912,949 B2 | 7/2005 | Brizio | |
| 7,040,378 B2 * | 5/2006 | Gellert | B22F 7/062 |
| | | | 164/312 |
| 7,757,876 B1 | 7/2010 | Ditter | |
| 8,322,535 B2 | 12/2012 | Shoham et al. | |
| 8,512,792 B2 | 8/2013 | Spijkerman | |
| 8,916,221 B2 | 12/2014 | Waldburger | |
| 9,049,837 B2 * | 6/2015 | Waldburger | A01J 25/13 |
| 9,713,314 B2 * | 7/2017 | Waldburger | A01J 25/15 |
| 9,902,089 B2 * | 2/2018 | Halford | B29C 35/0288 |
| 9,968,070 B2 * | 5/2018 | Waldburger | A01J 25/13 |
| 10,076,860 B2 * | 9/2018 | Jenko | B23P 15/007 |
| 10,729,095 B2 | 8/2020 | Kong | |
| 10,785,953 B2 | 9/2020 | Gruninger | |
| 10,785,954 B2 | 9/2020 | Gruninger | |
| 10,933,565 B2 * | 3/2021 | Halford | B29C 35/0294 |
| 11,284,598 B2 | 3/2022 | Grüninger | |
| 11,330,827 B2 | 5/2022 | Gruninger | |
| 2004/0079511 A1 * | 4/2004 | Gellert | B29C 45/2737 |
| | | | 164/312 |
| 2007/0196537 A1 | 8/2007 | Winkler | |
| 2008/0036112 A1 | 2/2008 | Gilg | |
| 2010/0239730 A1 | 9/2010 | Ditter | |
| 2010/0263551 A1 | 10/2010 | Pavero | |
| 2014/0087014 A1 * | 3/2014 | Waldburger | A01J 25/13 |
| | | | 425/84 |
| 2014/0087045 A1 | 3/2014 | Waldburger | |
| 2014/0367889 A1 * | 12/2014 | Halford | B29C 35/0288 |
| | | | 264/319 |
| 2015/0059593 A1 * | 3/2015 | Waldburger | A01J 25/13 |
| | | | 99/460 |
| 2015/0257358 A1 * | 9/2015 | Waldburger | A01J 25/13 |
| | | | 249/204 |
| 2015/0320007 A1 | 11/2015 | Hamm et al. | |
| 2016/0193768 A1 * | 7/2016 | Jenko | B23P 15/007 |
| | | | 419/53 |
| 2016/0346831 A1 * | 12/2016 | Snyder | B22C 9/10 |
| 2017/0043518 A1 * | 2/2017 | Narayanaswamy | |
| | | | B29C 33/3842 |
| 2017/0135309 A1 | 5/2017 | Gruninger | |
| 2017/0135310 A1 | 5/2017 | Gruninger | |
| 2017/0303498 A1 | 10/2017 | Kong | |
| 2019/0191659 A1 * | 6/2019 | Waldburger | A01J 25/15 |
| 2020/0053975 A1 | 2/2020 | Grüninger | |
| 2020/0390121 A1 | 12/2020 | Gruninger | |
| 2022/0378006 A1 | 12/2022 | Muller | |

FOREIGN PATENT DOCUMENTS

| | | |
|---|---|---|
| CH | 353573 A5 | 5/1961 |
| CH | 563142 | 2/1972 |
| CH | 573142 B5 | 9/1972 |
| CH | 704208 A2 | 6/2012 |
| CH | 706999 A1 | 3/2014 |
| CH | 707000 A1 | 3/2014 |
| DE | 821572 C | 7/1949 |
| DE | 878577 C | 6/1953 |
| DE | 922448 C | 1/1955 |
| DE | 1030612 B | 5/1958 |
| DE | B-1030612 B | 5/1958 |
| DE | 1582967 A1 | 7/1970 |
| DE | 2823182 A1 | 12/1978 |
| DE | C-2823182 A1 | 12/1978 |
| DE | 2950497 A1 | 6/1981 |
| DE | 3529895 A1 | 2/1987 |
| DE | 19613068 A1 | 10/1997 |
| DE | 29812845 U1 | 12/1998 |
| EP | 0126861 A1 | 3/1984 |
| EP | 350777 A1 | 1/1990 |
| EP | 0350777 A1 | 1/1990 |
| EP | 406899 A1 | 1/1991 |
| EP | 0406899 A1 | 1/1991 |
| EP | 0 406 899 B1 | 4/1992 |
| EP | 543185 A1 | 5/1993 |
| EP | 0543185 A1 | 5/1993 |
| EP | 0543899 A1 | 6/1993 |
| EP | 0922448 A2 | 6/1999 |
| EP | 1269832 A1 | 1/2003 |
| EP | 1591016 A1 | 11/2005 |
| EP | 1769676 A1 | 4/2007 |
| EP | 2710888 A1 | 3/2014 |
| EP | 2710889 A1 | 3/2014 |
| EP | 3167709 A1 | 5/2017 |
| EP | 3501269 B1 | 6/2019 |
| EP | 2845469 A1 | 11/2022 |
| FR | 2146532 A5 | 3/1973 |
| FR | 2462253 A5 | 2/1981 |
| FR | 2473840 A1 | 7/1981 |
| FR | 2527421 A1 | 12/1983 |
| FR | 2919467 A1 | 2/2009 |
| FR | 2981827 A1 | 5/2013 |
| GB | 951746 A | 3/1964 |
| GB | 1054727 A2 | 1/1967 |
| GB | 2065487 A | 7/1981 |
| GB | 2256379 A1 | 12/1992 |
| JP | H03-7552 | 1/1991 |
| NL | 8402355 A | 2/1986 |
| WO | 1992/03297 A1 | 3/1992 |
| WO | 2004/087513 A1 | 10/2004 |
| WO | 2013/051950 A1 | 4/2013 |

OTHER PUBLICATIONS

European Search Report issued for Application No. 13183880.7, dated Feb. 4, 2014, 6 pages.
University of Montana, Agricultural Experiment Station Circular #1, 1910.

(56) References Cited

OTHER PUBLICATIONS

European Search Report issued for Application No. 14181770, dated Feb. 9, 2015 (wth machine translation).
Google search results for "Considur fine hole trangular", retrieved Oct. 24, 20106 showing article entitled Belts With Interlaced Bards, Welded Wedge Wire Screens From Hein, www.hellotrade.com, 1 page, shown publication date Apr. 29, 2013.
Webpage from Hein Lehrmann website, Considur fine hole sheets, 1 page, retrieved Oct. 24, 2016, publication date prior to Jan. 1, 2013.
European Search Report issued for Application No. 15158045, dated Jul. 14, 2015, 3 pages.
European Search Report issued for Application No. 16194574, dated Feb. 14, 2017, 4 pages.
European Search Report issued for Application No. 16195210.6, dated Mar. 27, 2017, 3 pages.
European Search Report issued for Application No. 17165041, dated Sep. 7, 2017, 2 pages.
For U.S. Appl. No. 16/903,425; Office action dated May 3, 2021.
For U.S. Appl. No. 16/903,425; Response filed Jun. 8, 2021.
For U.S. Appl. No. 16/538,891; Office action dated Jun. 8, 2021.
For U.S. Appl. No. 16/903,425; Office action dated Jun. 23, 2021.
For U.S. Appl. No. 16/538,891: Response dated Oct. 22, 2019.
For U.S. Appl. No. 15/344,770: Response dated Dec. 26, 2020 notice of allowance dated Apr. 28, 2020.
For U.S. Appl. No. 15/344,909: response dated Dec. 26, 2019.
For U.S. Appl. No. 15/486,464: Response filed Dec. 26, 2019 notice of allowance dated Mar. 31, 2020.
European Search Report for European Application EP 20179193 dated Nov. 3, 2020.
For U.S. Appl. No. 15/344,909: Notice of Allowance dated Jun. 16, 2020.
For U.S. Appl. No. 15/344,770: Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/344,909: Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/486,464: Office Action dated Sep. 25, 2019.
For U.S. Appl. No. 16/903,425: Response filed Sep. 23, 2021 Final Office action dated Sep. 29, 2021.
For U.S. Appl. No. 16/538,891: Notice of Allowance dated Nov. 29, 2021.
For U.S. Appl. No. 16/903,425: After Final Reply, filed on Dec. 28, 2021 Notice of Allowance (and related papers) dated Jan. 19, 2022.
For U.S. Appl. No. 16/538,891; Response filed Aug. 16, 2021.
European Search Report dated Oct. 4, 2022, for European Patent Application No. 22 17 3656.

\* cited by examiner

PRESS COVER

FIELD OF THE INVENTION

The invention concerns a press cover that corresponds with a cheese mould, in particular a cheese mould that is arranged in a cassette press or similar.

BACKGROUND

A device for the industrial production of cheeses is of known art, for example, from EP-A-350777. This comprises a cheese press with a rectangular tray open at the top for the reception of moulds, a pillar frame for the arrangement of a compression head that can be raised and lowered, and a distribution head for the supply and metering of the curds into the moulds, and a portal carriage that can travel on the tray for purposes of guiding the distribution head and manipulating a turning mechanism for the moulds. Here the distribution head and the turning mechanism must be provided or changed manually. The wall of the mould consists of a perforated plate, and a plurality of moulds can be arranged in sets. The end surfaces of a set are provided with cylindrical pins for purposes of docking a manipulation device.

EP-A-406899 shows a development of such a device, in which the moulds are accommodated in cassettes, which in turn are arranged compactly in rows in the tray. Above the moulds a compression head is provided, with compression plungers aligned with the moulds for purposes of compressing the curds.

Here the actual press mould is surrounded by a cup-shaped casing with an air supply passage (EP-B-1269832). By this means an air passage is formed, and the air supplied can loosen the cheese mass adhering to the sieve holes of the perforated plate of the mould from the pressing hoop side after compression.

According to EP-B-543185, a mould or press cover can be connected to the compression plunger via a tilting device (self-centring), so that the mould cover is prevented from being sucked into the cheese mass as a consequence of any tilting movements. The mould itself is round or square and can consist of an outer container and an inner perforated casing.

BR 9300409 discloses a double-walled mould, which is provided with ribs crossing on its floor. However, these ribs serve only as a stop for a floor plate and are unsuitable as stiffening elements, and also are not intended for this purpose.

U.S. Pat. No. 3,838,955A discloses a mould for the production of cheddar, which has a mould and a press cover. The mould, and in particular the press cover, are of a solid design. The press cover and the floor of the mould are provided with a few holes 5 for the outflow of whey. The press cover is constructed in the form of a plate and consists of PP or PE. It provided with a raised solid flange, which has eyelets for purposes of suspension. The plate-form press cover is provided with a second, significantly thinner perforated plate facing the mould for the removal of whey from the cheese mass.

In order to achieve the required dimensional stability when pressing out the whey, such plate-form plastic press covers have a thickness of approx. 10 mm.

Another cheese mould with a perforated metal mould wall is disclosed in DE-B-1030612. The internal surface of this mould wall has evenly distributed, low elevations and depressions of up to approx. 1 mm, which are designed so as not to damage the rind when the cheese wheel is removed, even if the cheese is knocked out of the mould.

According to DE-C-2823182, such a cheese mould with perforated walls can also consist of plastic, the internal face of which is provided with parallel grooves with a triangular cross-section. In the transition region and one-piece floor region, the grooves are separated by ribs with interruptions. Mould walls or double floors of this type are time-consuming to clean.

SUMMARY

One aspect of the invention relates to a press cover that corresponds to a cheese mould, and which is suitable for arrangement on the compression head of a cassette press or similar, is simply constructed, withstands a compression pressure, and also satisfies high hygienic standards.

In one embodiment of the invention, the press cover essentially comprises a one-piece perforated plate, whose cross-section corresponds to the internal cross-section of a cheese mould, with which the press cover corresponds in normal use, with a ribbed structure integrally formed thereon, which imparts the necessary dimensional stability and rigidity to the press cover.

The press cover is manufactured in one piece, for example by milling out of a plate, or by 3D printing.

On the one hand the inventive press cover enables a good whey outflow, and on the other hand can be easily and completely cleaned on both sides.

The inventive press cover is produced in one piece in one operation from a food-approved plastic, for example from PE or PP.

Preferred embodiments are also disclosed.

The perforated plate preferably has a thickness of approx. 3-5 mm and is provided with a perforation pattern, except for the regions below the ribbed structure, which remain non-perforated. The hole diameter of the perforation pattern is preferably 0.4-1.0 mm. Smaller hole diameters are less easy to clean. The individual holes are arranged at a distance of 2-5 mm from each other.

In the case of round cheese moulds, individual ribs in the form of struts extend over the centre of the press cover, preferably radially from the longitudinal axis of the cheese mould over the perforated plate to the circumference. They thereby cross annular transverse ribs and are connected to the latter, wherein a plurality of rings with different diameters can be provided, spaced apart from each other. In the case of polygonal cheese moulds, struts parallel to the outer edges are also possible instead of the rings.

The ribbed structure also has upwardly directed eyelets or similar, which enable the press cover to be arranged, for example, on a compression plunger.

The inventive press cover can be embodied with any cross-section, in particular a round or square cross-section. However, special shapes, such as a heart-shaped cross-section, would also be possible.

The ribbed structure can also accordingly be applied to shapes of any cross-section, in particular to round and rectangular shapes, with appropriate adaptations.

The ribs are dimensioned such that the external dimensions of existing cassettes can remain unchanged for the accommodation of cheese moulds.

Such shaping, choice of materials and production methods do not obviously ensue from the prior art. Press covers of previous known art, on the other hand, consist, for example, of a rigid cover plate made of steel or plastic, the shape and dimensions of which correspond to the internal cross-section of a cheese mould, and a thin perforated plate arranged on the underside of the cover plate. The cover plate also has a number of larger openings for the outflow of whey when pressing the curds.

In the non-perforated regions of the cover plate of the prior art, whey and cheese residues or other impurities can accumulate, which are invisible and can only be removed with difficulty.

BRIEF DESCRIPTION OF THE DRAWINGS

In what follows the invention will be described in more detail in an example of embodiment. In the figures.

DETAILED DESCRIPTION

Figure 1:
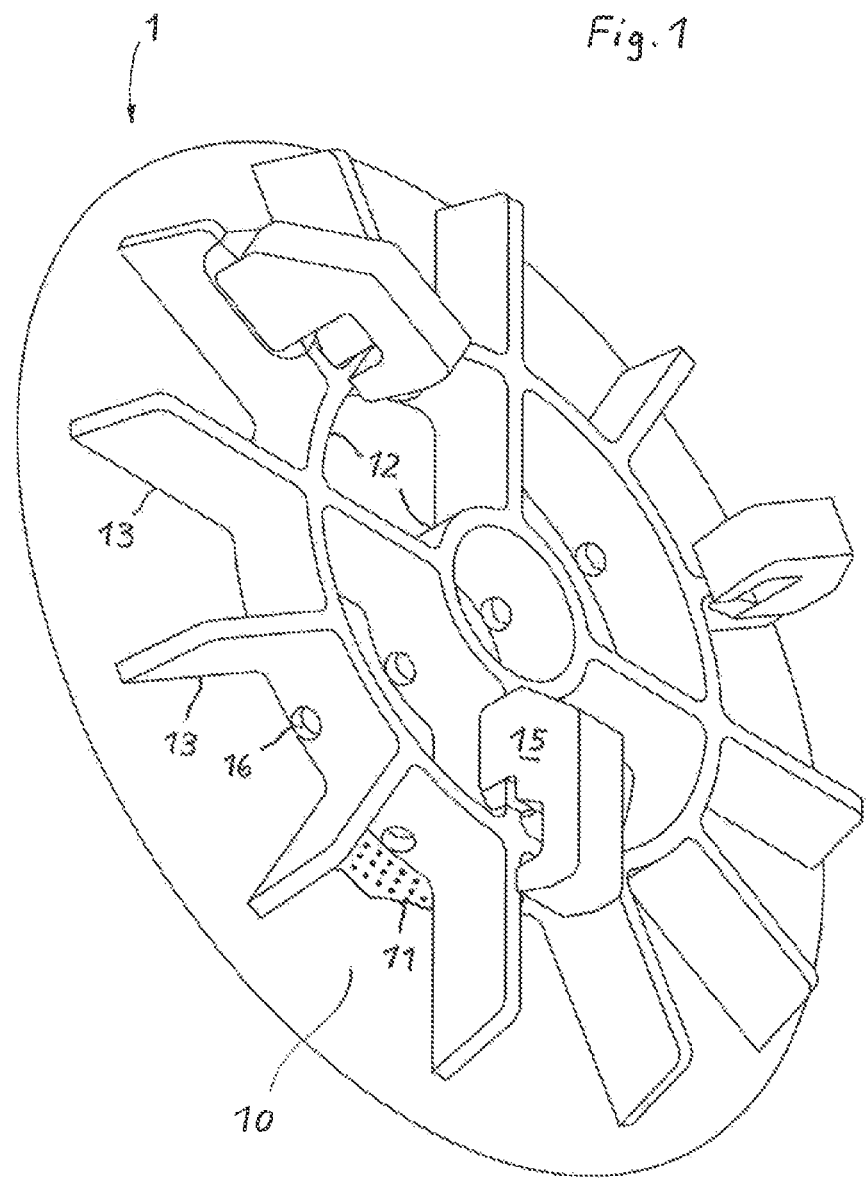
FIG. 1: shows an inventive press cover.

An inventive press cover 1 (FIG. 1) made of PE, in the example of a round cheese mould, comprises a single-walled, circular perforated plate 10, the cross-section of which corresponds to the internal cross-section of the cheese mould (also circular).

On the perforated plate 10, on the side facing away from the cheese mould, a stiffening ribbed structure 12, 13 is integrally formed, which gives the press cover 1 the necessary stiffness for pressing out the whey. The ribbed structure 12, 13 comprises webs 13 (longitudinal ribs) and solid rings 12 (transverse ribs) arranged annularly above the perforated plate. The webs 13 extend over the centre of the press cover, preferably radially from the centre or longitudinal axis of the cheese mould over the perforated plate 10 to the circumference of the perforated plate 10. They thereby cross the annularly arranged solid rings 12 and are connected to the latter at the crossing points, wherein a plurality of rings 12 with different diameters can be provided, spaced apart from each other.

Figure 2:
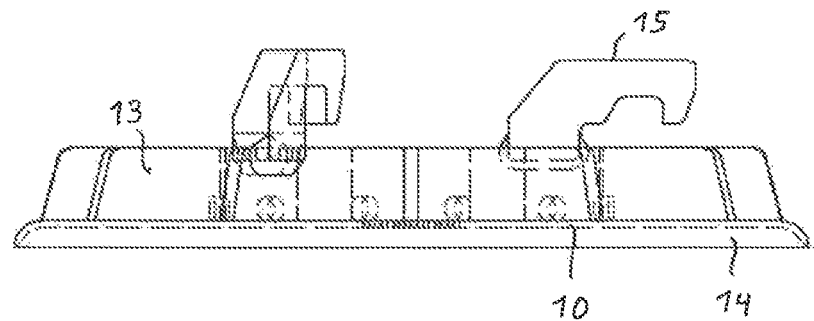
FIG. 2: shows the press cover from FIG. 1 in a side view.
Figure 3:
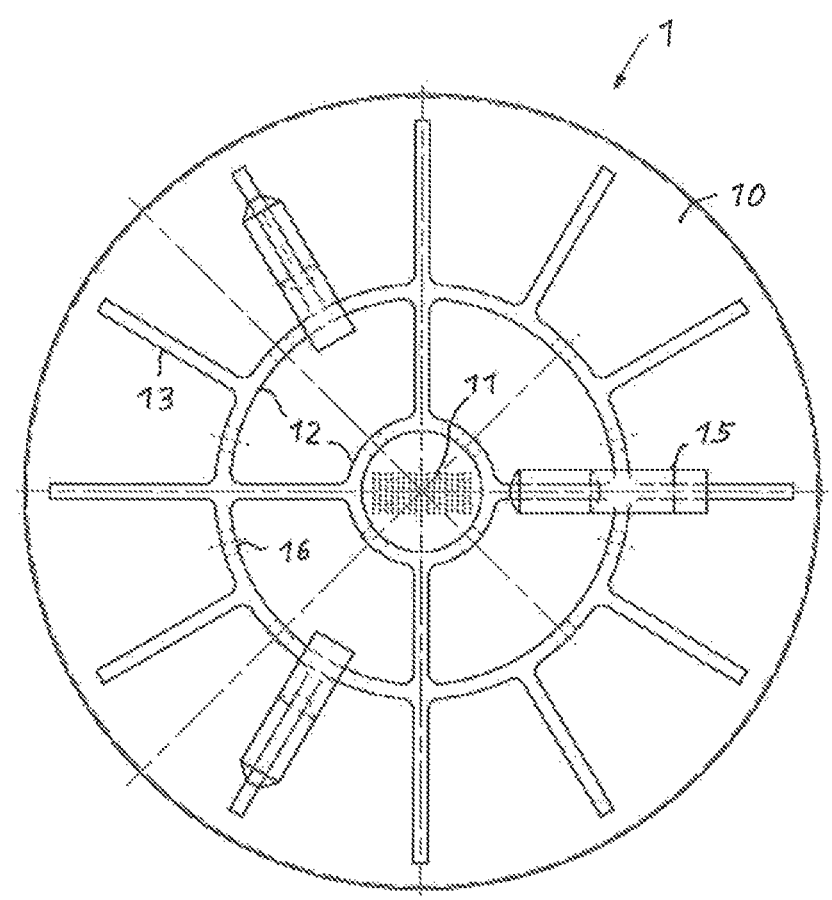
FIG. 3: shows the press cover from FIG. 1 in a plan view.

In the example, the perforated plate has a wall thickness (thickness) of approx. 3 mm and is provided on the circumference with a rim 14 facing towards the cheese mould (FIG. 2). In the example, the said rim 14 is flexible and fits closely against the internal wall of the cheese mould when the whey is being pressed out. With the exception of the ribbed structure 12, 13, the perforated plate 10 is provided with a perforation pattern 11 (shown in an exemplary form in FIGS. 1 and 3). The regions below the ribbed structure 12, 13 remain non-perforated. The hole diameter is 0.4-1.0 mm. Smaller hole diameters can cause problems during cleaning; hole diameters larger than 1 mm are not necessary for a good whey outflow.

The rings 12 are provided with openings 16 between two webs 13 for the outflow of liquids.

In the example, three hooks 15 are also welded to the webs 13 for arrangement on a compression plunger.

The inventive press cover 1 is produced in one piece; in the example it is milled out of the solid from a plate of PE (or another food-approved plastic). The perforated plate 10 and the ribbed structure 12, 13 are thus connected to each other in a materially-bonded and form-fit manner, inseparably and without connecting elements. This ensures on the one hand a high dimensional stability, and on the other hand a very good cleanability. There are no gaps or similar in which cheese mass or dirt could collect.

No perforation pattern 11 is provided in the vicinity of the ribbed structures 12, 13, which further improves the hygiene of the press cover 1.

Instead of production of the press cover 1 by machining, the latter could also be produced in a 3D-printer from a plastic in one piece. However, the perforation pattern 11 would have to be introduced subsequently.

A round cheese mould, with which the inventive press cover 1 corresponds, and as disclosed by the applicant, for example, in EP 2845469 A1, comprises a cylindrical casing with an upper basket and a floor.

For cheese that is to be highly pressed, i.e. hard cheese, the casing wall and, if necessary, also the floor are made of Conidur® fine perforated sheet. As a result of the specific perforation pattern, the formation of "hairs", such as occurs with plastic moulds, or normal, thicker perforated sheets, can be avoided.

When pressing soft cheese or semi-hard cheese, however, a conventional perforation pattern can be sufficient. The perforated plate below the basket can have a whey rim with a coarser perforation pattern than the rest of the casing, in particular for the production of hard cheese. In the case of softer cheese, a different perforation pattern for the casing is not mandatory.

The cheese moulds can in principle also consist of plastic.

The cheese moulds are used in cassette presses of known art, which are not shown. Such a cassette press serves, in a manner known per se, for the compression of curds with the reduction of liquid content, and comprises in particular:

a tray that is rectangular in plan view and open at the top, with cassettes that are rectangular in plan view and open at the top, arranged side by side in rows transverse to the longitudinal direction of the tray, cheese moulds for the accommodation of the curds to be compressed; these are arranged in the cassettes and have at least a floor and a casing with at least one outlet for the liquid to be pressed out, wherein a cassette comprises at least one cheese mould, and at least the floor of the cheese mould can be provided with a ribbed structure, and wherein the cheese mould can be part of the cassette, a compression head mounted on end pillars and having a plurality of compression plungers aligned with the cheese moulds, with a press cover 1 located thereon, for compressing the curds, e.g. designed in accordance with the disclosure of EP 543899 B1, and, if required, hold-down means for releasing the compression head from the cassette, a pipe distribution system or a filling device for filling the curds into the cheese moulds, at least one manipulation device, which can be traversed along the longitudinal sides of the tray, for purposes of lifting, moving and depositing a cassette onto a conveyor device outside the tray, a device for rotating/turning the cassette, or row of cassettes, about its longitudinal axis.

The cassette press can also preferably be assigned a vibrator in the form of a clamping frame for the accommodation of a cassette; this is arranged horizontally above the conveyor device and is spring-mounted, and is provided with unbalance motors. The cheeses are only emptied onto the conveyor device after being vibrated.

LIST OF REFERENCE SYMBOLS

1 Press cover
10 Perforated plate

11 Perforation pattern
12 Transverse rib, ring
13 Longitudinal rib, web
14 Rim
15 Hook, eyelet
16 Opening

The invention claimed is:

1. A press cover of a cheese mould, a cross-section of the press cover corresponding to an internal cross-section of the cheese mould, the press cover comprising:
    a single-walled perforated plate with a ribbed structure monolithically formed on a side of the perforated plate facing away from the cheese mould such that the perforated plate and the ribbed structure are connected to each other inseparably and without connecting elements,
    wherein the press cover including the perforated plate and the ribbed structure is only one piece and is entirely made of a food-approved plastic,
    wherein the ribbed structure comprises longitudinal ribs forming webs, and annular transverse ribs arranged crossing the longitudinal ribs,
    wherein the annular transverse ribs comprise a plurality of solid annular rings above the perforated plate with different diameters, and
    wherein each of the solid annular rings is provided with a plurality of openings configured for an outflow of liquid through that solid annular ring, each of the openings being provided in one of the solid annular rings itself between two of the longitudinal ribs.

2. The press cover of claim 1, wherein at least two of the longitudinal ribs extend radially over the perforated plate towards a circumference of the perforated plate, so as to cross through at least one of the annular transverse ribs.

3. The press cover of claim 1, wherein the perforated plate is provided with a perforation pattern comprising holes, the holes of the perforation pattern not being located in regions below the ribbed structure.

4. The press cover of claim 3,
    wherein a diameter of each of the holes of the perforation pattern is 0.4-1.0 mm, and
    wherein the holes are arranged at a distance of 2-5 mm from one another.

5. The press cover of claim 1, wherein the perforated plate has a wall thickness of 3-5 mm.

6. The press cover of claim 1, wherein the annular transverse ribs are spaced apart from one another.

7. The press cover of claim 1, wherein the press cover is entirely made of polyethylene.

8. The press cover of claim 1, wherein the press cover is entirely made of polypropylene.

9. A press cover of a cheese mould, a cross-section of the press cover corresponding to an internal cross-section of the cheese mould, the press cover comprising:
    a single-walled perforated plate with a ribbed structure monolithically formed with the perforated plate such that the press cover, which includes the perforated plate and the ribbed structure, is formed as only one piece of a food-approved plastic,
    wherein the ribbed structure is on a side of the perforated plate that faces away from the cheese mould, the ribbed structure comprising longitudinal ribs extending radially, and annular transverse ribs, a plurality of the longitudinal ribs crossing through at least one of the annular transverse ribs,
    wherein the annular transverse ribs comprise a plurality of solid annular rings above the perforated plate with different diameters, and
    wherein each of the solid annular rings is provided with a plurality of openings configured for an outflow of liquid through that solid annular ring, each of the openings being provided in one of the solid annular rings itself between two of the longitudinal ribs.

10. The press cover of claim 9, wherein the ribbed structure and the perforated plate are connected to each other inseparably without connecting elements.

11. The press cover of claim 9, wherein the press cover is made of polyethylene.

12. The press cover of claim 9, wherein the press cover is made of polypropylene.

13. The press cover of claim 9, wherein the perforated plate is provided with a perforation pattern comprising holes, the holes of the perforation pattern not being located in regions below the ribbed structure.

14. The press cover of claim 1, wherein a separate perforated wall is neither arranged below the ribbed structure nor attached to the perforated plate of the press cover.

15. A press cover of a cheese mould, a cross-section of the press cover corresponding to an internal cross-section of the cheese mould, the press cover comprising:
    a single-walled perforated plate with a ribbed structure formed above the perforated plate on a side of the perforated plate facing away from the cheese mould,
    wherein the press cover, which includes the perforated plate and the ribbed structure, is manufactured in only one piece such that the perforated plate and the ribbed structure are monolithically formed and connected to each other inseparably without connecting elements, the press cover being entirely made of a food-approved plastic, and
    wherein the ribbed structure comprises longitudinal ribs forming webs, and annular transverse ribs, a plurality of the longitudinal ribs crossing through at least one of the annular transverse ribs, wherein each of the solid annular rings is provided with a plurality of openings configured for an outflow of liquid through that solid annular ring, each of the openings being provided in one of the solid annular rings itself between two of the longitudinal ribs.

16. The press cover of claim 15, wherein the annular transverse ribs comprise a plurality of solid annular rings above the perforated plate with different diameters.

* * * * *